United States Patent Office 3,430,132
Patented Feb. 25, 1969

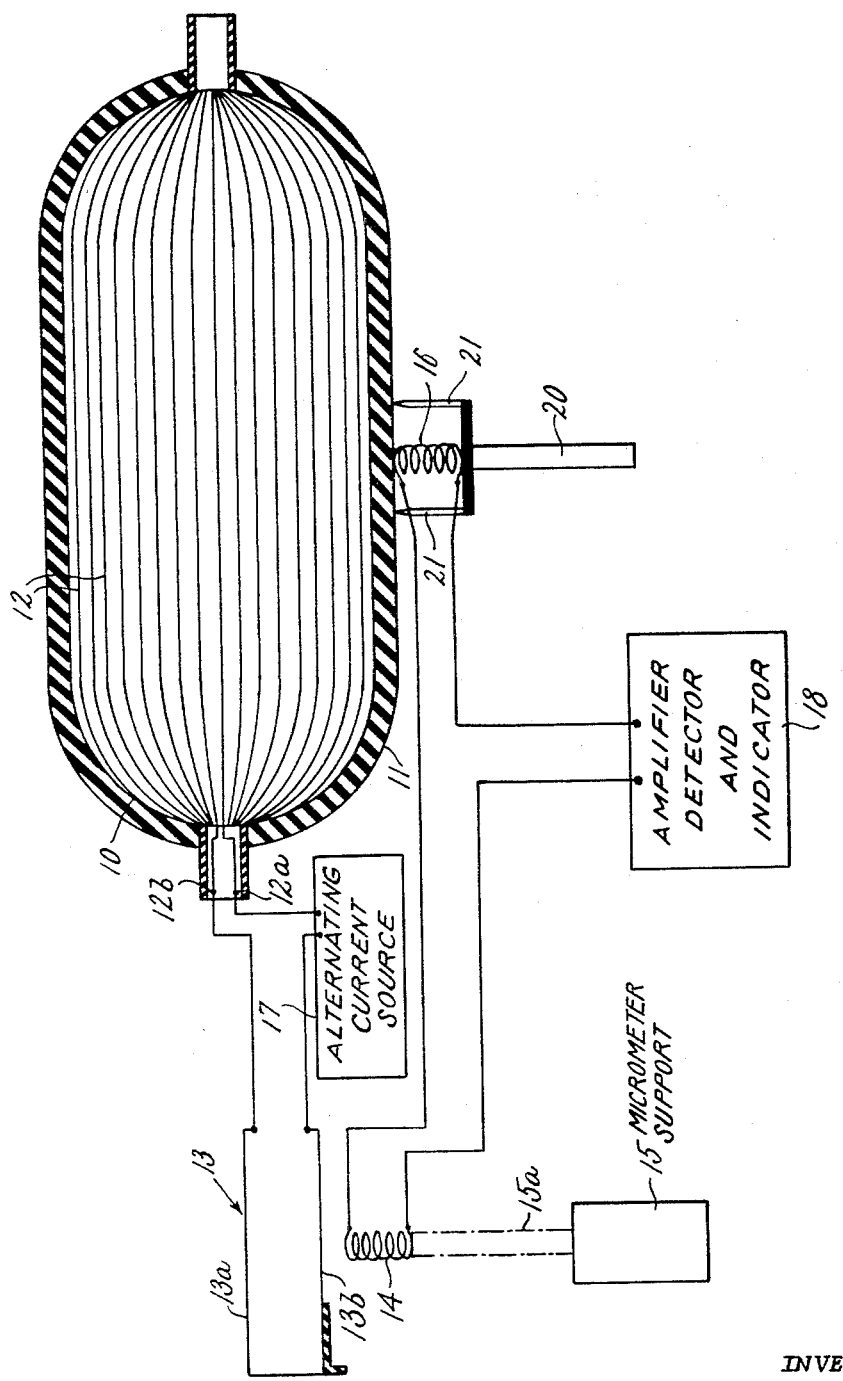

3,430,132
MAGNETIC THICKNESS MEASURING APPARATUS UTILIZING ONE FIXED AND ONE MOVABLE MEASURING COIL
Daniel R. Elliott, Ridgewood, N.J., assignor to Uniroyal, Inc., a corporation of New Jersey
Filed Feb. 28, 1964, Ser. No. 348,093
U.S. Cl. 324—34                                                       4 Claims
Int. Cl. G01r 33/00

ABSTRACT OF THE DISCLOSURE

An apparatus for measuring the thickness of a nonmagnetic, electrically nonconductive article wherein a nonmagnetic, electrically nonconductive base, having an electrical conductor wound over its surface, supports the article to be measured. A supply of alternating current is coupled to the conductor and an electrical pick-up winding is positioned in fixed proximity from and movable over the surface of the article. The conductor and the pick-up winding are so magnetically intercoupled that the output signal at the pick-up winding is proportional to the wall thickness of the article.

---

This invention relates to thickness measuring apparatus and, more particularly, to apparatus for measuring the thickness of hollow nonmagnetic, electrically nonconductive articles such as elastomeric heat insulator cases for solid fuels used in rockets. Such articles and destructible mandrels for building the insulator cases are described in U.S. Patent 3,083,409 to Crawford et al. The apparatus is also useful for measuring the thickness of articles at inaccessible points of the articles.

In the manufacture of such insulator cases, the thickness of the insulator case is critical and measurement of the thickness to a tolerance of, for example, .005 inch is desirable. Ordinarily, uncured elastomeric heat insulation material is applied in layers to the surface of a destructible building mandrel and then is passed through a vulcanization cure which causes the elastomeric material to become hard and rigid. The insulator case may then be subjected to grinding to desired external dimensions. During the various processing steps, however, the plaster mandrel changes shape and dimensions slightly, causing a similar change in the innner dimensions of the case. Accordingly, it is necessary to measure accurately the thickness of the insulation material on the surface of the mandrel after curing to permit accurate grinding to proper thickness.

It is an object of the invention, therefore, to provide new and improved apparatus for measuring the thickness of nonmagnetic, electrically nonconductive articles at inaccessible points thereof.

It is another object of the invention to provide new and improved thickness measuring apparatus which is sensitive and provides a precise measurement of wall thickness of hollow elastomeric vessels.

It is another object of the invention to provide new and improved thickness measuring apparatus of relatively simple construction for measuring the thickness of hollow elastomeric vessels, independently of the orientation of the apparatus with respect to the earth's magnetic field.

In accordance with the invention, apparatus for measuring the thickness of a nonmagnetic, electrically nonconductive article comprises a nonmagnetic, electrically nonconductive base, having an electrical conductor attached thereto, for supporting a nonmagnetic article with the conductor on an inaccessible side of a wall of the article. The apparatus includes a reference electrical conductor spaced from the article and an electrical winding adjustably spaced from said reference conductor. The apparatus also includes an electrical winding positioned in fixed proximity to an accessible side of the wall of the article and circuit means for supplying an alternating-current signal component coupled to two of the windings and conductors. The other two of the windings and conductors are coupled in series with each other. The windings and conductors are so magnetically intercoupled as to develop an output signal representative of the difference between the signals developed in the adjustably positioned winding and the winding positioned in proximity to the accessible side of the wall, thereby to represent the thickness of the article.

For a better understanding of the present invention, together with other and further objects thereof, reference is made to the following description taken in connection with the accompanying drawing, and its scope will be pointed out in the appended claims.

Referring now to the drawing:

The figure is a schematic diagram of apparatus constructed in accordance with the invention.

Referring more particularly to the drawing, thickness-measuring apparatus preferably comprises a nonmagnetic, electrically nonconductive mandrel 10 for supporting a hollow nonmagnetic, electrically nonconductive article 11 shown in fragmentary sectional view. The mandrel 10 may, for example, be of a generally cylindrical plaster of Paris construction similar to that described in U.S. Patent 3,083,409. The mandrel 10 has an electrical conductor attached thereto comprising, for example, one or more loops of copper wire 12 continuously wrapped on the mandrel and preferably embedded in the surface thereof and covering the points of measurement over which the thickness of insulation is to be determined subsequently. The loops are, for example, a single continuous winding of major loops extending generally axially of the mandrel and extending around the entire periphery of the mandrel, terminating at terminals 12a, 12b in a central hollow shaft of the mandrel. Adjacent loops are spaced by, for example, two or three inches on the surface of the mandrel. The wire 12 preferably may alternatively be wound as a non-inductive winding, that is, with adjacent conductors carrying current in opposite directions, by continuously winding the wire 12 clockwise and then counterclockwise from one end of the mandrel to the other with successive turns forming adjacent conductors spaced by two or three inches.

The apparatus also includes a reference electrical conductor 13 outside the article, which, for convenience, has a smaller loop size than the winding on the mandrel. The conductor 13 may comprise one or more rigid loops, preferably with the opposite longitudinal loop portions 13a, 13b separated by a sufficient distance to render their magnetic fields substantially independent.

The apparatus also includes an electrical winding 14 adjustably spaced from the reference conductor 13 and preferably positioned with the winding 14 in close proximity to the reference conductor portion 13b and the axis of winding 14 being in a plane normal to said conductor and normal to a straight line in said plane from the conductor to the mid-point of winding 14 (contrary to the schematic representation of winding 14 in the drawing tne axis of the coil is perpendicular to the plane of the drawing), so that said axis lies along the path of circular magnetic lines of force surrounding said conductor. The apparatus also includes means 15 for adjusting the spacing between the adjustable winding and the reference conductor portion 13b. Any suitable adjusting means may be used, for example, a micrometer type support 15 on which the winding 14 is mounted as indicated by the broken line 15a.

The apparatus also includes an electrical winding 16 positioned in fixed proximity to the outer wall of the hollow article 11. The winding 16 is mounted on a suitable manually held support 20 having probe fingers 21, 21 to aid in positioning the winding 16 against the outer wall of the article 11 preferably at a point of minimum thickness of the wall and preferably with the axis of the winding 16 being in a plane normal to the selected conductor at the selected test point and normal to a straight line from said test point to the mid-point of winding 16 (contrary to the schematic representation of winding 16 in the drawing the axis of the coil is perpendicular to the plane of the drawing), so that said axis lies along the path of circular magnetic lines of force surrounding said conductor.

The conductor 12 and winding 16 and the conductor 13 and the winding 14 are so magnetically intercoupled as to develop an output signal representative of the difference between the signals developed in the adjustable winding 14 and the winding 16 positioned against the outer wall of the hollow article. More particularly, mandrel winding 12 and reference loop 13 are coupled in series with a suitable alternating current source 17 developing an output signal having a frequency of, for example, 1,000 cycles. The adjustably positioned winding 14 and the winding 16 are coupled in series opposition with each other and across amplifier, detector and indicator 18 for developing an indication of the difference in magnitude of the voltages induced in the adjustable winding 14 and the winding 16.

Loops 12 and 13 preferably are not inductively coupled to each other. Inductive coupling between loops 12 and 13 can be compensated by calibration, however, if they are fixedly positioned with respect to each other. Small radio-frequency oscillator coils are suitable for use as windings 14 and 16.

In response to the alternating-current signal component supplied by the source 17, magnetic fields are developed in the vicinity of the portions of loops 12 and 13 adjacent windings 14 and 16. The fields induce voltages in windings 14 and 16 which are connected in series opposition to provide a difference voltage across the indicator. If the rear conductor portion 13a of winding 13 is sufficiently removed from the front conductor portion 13b of that winding and if the rear conductor of winding 12 is sufficiently removed from the front conductor thereof or if the winding 12 is a non-inductive winding, and with the winding 14 being of the same size and shape as the winding 16, then a zero indication or null will be obtained when the axis of the winding 14 lies along the direction of the magnetic flux surrounding the conductor 13, when the axis of the winding 16 lies along the direction of the magnetic flux surrounding the front conductor of winding 12, and when the winding 14 is at the same distance from winding 13 as winding 16 is from winding 12. Thus, with a nonmagnetic, nonconductive material between the winding 16 and the winding 12, the thickness of the insulator case 11 can be measured by measuring the distance of winding 14 from reference winding 13, when the null indication is obtained. If the windings 14 and 16 are not of the same size or shape, then the distance of the winding 14 from the winding 13 may be calibrated in terms of the distance of the winding 16 from the winding 12 prior to placing the hollow article 11 over the mandrel.

It should be understood that the alternating-current source may comprise a direct-current source and a suitable interrupter for developing an alternating-current signal component.

The sensitivity of the apparatus is not changed if the detector is connected in series with the conductors 12 and 13 and the alternating-current source is connected in series with the windings 14 and 16.

Further, a single-turn winding may be utilized for each of windings 14 and 16, but usually multiple turns are desired for increased sensitivity and precision.

While there has been described what is at present believed to be the preferred embodiment of the invention, it will be obvious to those skilled in the art that various changes and modifications may be made therein without departing from the invention, and it is, therefore aimed to cover all such changes and modifications as fall within the true spirit and scope of the invention.

Having thus described my invention, what I claim and desire to protect by Letters Patent is:

1. Apparatus for measuring the thickness of a nonmagnetic, electrically nonconductive article comprising:
   a nonmagnetic, electrically nonconductive base, having an electrical conductor attached thereto, for supporting a nonmagnetic, electrically nonconductive article with the conductor on an inaccessible side of a wall of the article, in fixed relationship with said article and relatively non-movable along said article;
   a reference electrical conductor spaced from the article;
   an electrical winding adjustably spaced from said reference conductor;
   means for adjusting the spacing between said adjustable winding and said reference conductor;
   said conductor attached to the nonconductive base forming a continuous path on the base and extending over those portions of said base and through those points on the base adjacent to points on the said unaccessible side of the wall of the article where a thickness measurement of the article is desired;
   an electrical winding positioned in fixed proximity from and movable over the surface of an accessible side of the wall of the article and with the axis of said electrical winding, during measurement of thickness of the article adjacent any selected point along the conductor path, being in a plane substantially normal to the conductor at said selected point and substantially normal to a straight line from said selected point to the point along the axis of said winding which is halfway between the outer ends of said winding;
   circuit means for supplying an alternating current signal component coupled in series with said electrical conductors, the said windings being coupled in series with each other;
   said windings and conductors being so magnetically intercoupled as to develop an output signal representative of the difference between the signals developed in said adjustably positioned winding and said winding positioned in proximity to said accessible side of said wall, thereby to represent the thickness of the article.

2. Apparatus for measuring the thickness of a hollow nonmagnetic, electrically nonconductive article comprising:
   a nonmagnetic, electrically insulated mandrel, having an electrical winding attached thereto, for supporting a nonmagnetic, electrically nonconductive hollow article with the winding inside the article;
   a reference electrical winding outside the article and electrically coupled in series with the mandrel winding;
   an electrical winding adjustably spaced from said reference winding;
   means for adjusting the spacing between said adjustable winding and said reference winding;
   an electrical winding positioned in fixed proximity to the outer wall of the hollow article;
   circuit means for supplying an alternating-current signal component coupled in series with said mandrel winding and said reference winding, said adjustable winding and said winding positioned against the outer wall of said hollow article being coupled in series with each other;
   said windings being so magnetically intercoupled as to develop an output signal representative of the difference between the signals developed in said adjustable winding and said winding positioned against said outer wall, thereby to represent the thickness of the article.

3. Apparatus for measuring the thickness of a nonmagnetic, electrically nonconductive article comprising:
  a nonmagnetic, electrically insulated mandrel, having an electrical conductor attached thereto, for supporting a nonmagnetic, electrically nonconductive hollow article with one conductor inside the article and in fixed relationship with said article;
  a reference electrical conductor outside the article and electrically coupled in series with the mandrel conductor;
  an electrical winding adjustably spaced from said reference conductor;
  means for adjusting the spacing between said adjustable winding and said reference conductor;
  a second electrical winding positioned in fixed proximity from and movable over the surface of the outer wall of the hollow article;
  said mandrel conductor comprising a continuous winding on the mandrel, and extending over sufficient area of the surface to allow magnetic intercoupling between said mandrel conductor and said second winding wherever a measurement is desired;
  circuit means for supplying an alternating current signal component coupled in series with said mandrel conductor and said reference conductor, said adjustable winding and said second winding positioned against the outer wall of said hollow article being coupled in series with each other;
  said windings and conductors being so magnetically intercoupled as to develop an output signal representative of the difference between the signals developed in said adjustable winding and said winding positioned against said outer wall, thereby to represent the thickness of the article.

4. Apparatus for measuring the thickness of a nonmagnetic, electrically nonconductive article comprising:
  a nonmagnetic, electrically insulated base, having an electrical conductor attached thereto for supporting a nonmagnetic, electrically nonconductive article with the conductor on an inaccessible side of a wall of the article and in fixed relationship with and relatively non-movable along said article;
  an electrical winding positioned in fixed proximity from and movable over the surface of an accessible side of the wall of the article;
  said electrical conductor forming a continuous path on the base and extending through those points adjacent to points on said inaccessible side of the article where a thickness measure of the article is desired, the axis of said electrical winding, during measurement of the thickness of the article adjacent any selected point along the conductor path, being in a plane substantially normal to the conductor at said selected point and substantially normal to a straight line from said selected point to the point along the axis of said winding which is halfway between the opposite ends of said windings;
  circuit means for supplying an alternating-current signal component coupled to said conductor;
  said winding and conductor being so magnetically intercoupled as to develop an output signal representative of the thickness of the article.

References Cited

UNITED STATES PATENTS

| 2,563,254 | 8/1951 | Lewis | 324—34 |
| 1,989,037 | 1/1935 | Brown | 324—34 |
| 2,116,119 | 5/1938 | Loewenstein | 324—34 |
| 2,503,720 | 4/1950 | Giesake | 324—34 |

FOREIGN PATENTS 730,973    1/1943    Germany.

OTHER REFERENCES

Electronics: August 1950, pp. 182–186, "Ceramic Thickness Gage," copy in 324–34T.

RUDOLPH V. ROLINEC, *Primary Examiner.*

R. J. CORCORAN, *Assistant Examiner.*